(12) United States Patent
Darde et al.

(10) Patent No.: US 8,377,401 B2
(45) Date of Patent: Feb. 19, 2013

(54) PROCESS AND APPARATUS FOR THE SEPARATION OF A GASEOUS MIXTURE

(75) Inventors: Arthur Darde, Paris (FR); Bao Ha, San Ramon, CA (US); Jean-Pierre Tranier, L'Hay-les-Roses (FR)

(73) Assignees: Air Liquid Process & Construction, Inc., Houston, TX (US); L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 348 days.

(21) Appl. No.: 12/721,929

(22) Filed: Mar. 11, 2010

(65) Prior Publication Data

US 2010/0206202 A1    Aug. 19, 2010

Related U.S. Application Data

(62) Division of application No. 11/776,483, filed on Jul. 11, 2007, now Pat. No. 7,708,804.

(51) Int. Cl.
*F25J 3/08* (2006.01)
*C01B 31/20* (2006.01)

(52) U.S. Cl. .......................................... 423/235; 62/617
(58) Field of Classification Search ............... 95/129, 95/236; 423/220, 226, 228, 229, 235, 239.1, 423/239.2; 62/600, 606, 617; 96/134, 234, 96/243
See application file for complete search history.

(56) References Cited

U.S. PATENT DOCUMENTS 3,649,188 A    3/1972    Keilin et al.
4,267,155 A *  5/1981    Kobayashi et al. ........... 423/235
5,100,635 A *  3/1992    Krishnamurthy et al. .... 423/235
2003/0097840 A1 5/2003    Hsu

FOREIGN PATENT DOCUMENTS

| EP | 0503910 | 3/1992 |
| EP | 0503910 | 9/1992 |
| FR | 2872890 | 1/2006 |

OTHER PUBLICATIONS

Search Report and Written Opinion from PCT/IB2008/052793, mailed May 2010.
Zhou et al., "Control of NOx Emissions by NOx Recycle Approach" 19960101, vol. 26, No. 2, Jan. 1, 1996, pp. 2091-2097, XP022031790, abstract, Figure 8.
Hu Y Q et al., "Effects of Coal Properties on Recycled-NOx Reduction in Coal Combustion With 02/Recycled Flue Gas", Energy Conversion and Management, Elsevier Science Publishers, Oxford, GB LNKD-DOI:10.1016/S0196-8904(02)00240-6, vol. 44, No. 14, Aug. 1, 2003, pp. 2331-2340, XP004419923, ISSN: 0196-8904, abstract p. 2332, "1. Introduction."
Database CA [Online] Chemical Abstracts Service, Columbus, Ohio, US; May 12, 1984, Miyazaki, Junichi et al., "Removing Nitrogen Oxides and Sulfur Dioxide From Flue Gas" XP002579125 retrieved from STN Database Accession No. 81:53908 abstract & JP 49 029275 A (Chiyoda Chemical Enginnering and Construction Co., Ltd) Mar. 15, 1974.
"Oxy-Combusiton Processes for CO2 Capture from Power Plant", IEA Report No. 2005/9, Sep. 2005, Process Flow Diagrams 6, p. 1, and 11, p. 1.

* cited by examiner

*Primary Examiner* — Frank Lawrence, Jr.
(74) *Attorney, Agent, or Firm* — Elwood L. Haynes

(57) ABSTRACT

A process for separating carbon dioxide from a fluid containing carbon dioxide, $NO_2$, and at least one of oxygen, argon, and nitrogen comprises the steps of separating at least part of the fluid into a carbon dioxide enriched stream, a carbon dioxide depleted stream comprising $CO_2$ and at least one of oxygen, argon, and nitrogen and a $NO_2$ enriched stream and recycling said $NO_2$ enriched stream upstream of the separation step.

4 Claims, 4 Drawing Sheets

US 8,377,401 B2

PROCESS AND APPARATUS FOR THE SEPARATION OF A GASEOUS MIXTURE

CROSS REFERENCE TO RELATED APPLICATION

The present application is a divisional of U.S. patent application Ser. No. 11/776,483 filed Jul. 11, 2007, now U.S. Pat. No. 7,708,804, the entire contents of which are incorporated herein by reference.

TECHNICAL FIELD

The present invention relates to a process and apparatus for the separation of gaseous mixture containing carbon dioxide as main component. It relates in particular to processes and apparatus for purifying carbon dioxide, for example coming from combustion of a carbon containing fuel, such as takes place in an oxycombustion fossil fuel or biomass power plant.

BACKGROUND ART

The combustion of carbon containing fuels (biomass, waste, fossil fuels such as coal, lignite, hydrocarbons, . . . ) produces $CO_2$ and gases, such as $SO_2$, $SO_3$, NOx, which pollute the atmosphere and are major contributors to the greenhouse effect especially $CO_2$. These emissions of $CO_2$ are concentrated in four main sectors: power generation, industrial processes, transportation, and residential and commercial buildings. The main application of $CO_2$ capture is likely to be in power generation and large energy consuming industries, particularly cement, iron and steel and chemical production and oil refining. Capturing $CO_2$ directly from small and mobile sources in the transportation and domestic and commercial buildings sectors is expected to be significantly more difficult and expensive. Most of the emissions of $CO_2$ to the atmosphere from the electricity generation and industrial sectors are currently in the form of flue gas from combustion, in which the $CO_2$ concentration is typically 4-14% by volume, although $CO_2$ is produced at high concentrations by a few industrial processes. In principle, flue gas could be stored, to avoid emissions of $CO_2$ to the atmosphere it would have to be compressed to a pressure of typically more than 100 bar abs and this would consume an excessive amount of energy. Also, the high volume of the flue gas would mean that storage reservoirs would be filled quickly. For these reasons it is preferable to produce relatively high purity stream of $CO_2$ for transport and storage; this process is called $CO_2$ capture. This carbon dioxide could be used for enhanced oil recovery or just injected in depleted gas and oil fields or in aquifers.

The present invention is based on application to the power generation sector. Nevertheless, it could also be applied to flue gases coming from other industrial processes with a relatively high purity, above 50% by volume (dry base).

There are three main techniques for capture of $CO_2$ in power plants:

Post-combustion: the flue gas from a power station is scrubbed with a chemical solvent such as an aqueous solution of amines which will remove the $CO_2$ by absorption.

Pre-combustion: the fuel together with oxygen is sent to a gasifier where a synthesis gas (main component of the mixture: $H_2$, CO and $CO_2$) is produced. CO is then shifted to $H_2$ and $CO_2$ (CO+H2O<>$CO_2$+$H_2$) and $CO_2$ is scrubbed by a physical or chemical solvent. A mixture containing essentially $H_2$ and $N_2$ is sent to a gas turbine where it is burnt.

Oxycombustion: in order to increase the carbon dioxide content in the flue gas, the fuel is burnt with a mixture of mainly carbon dioxide and oxygen instead of air. This mixture of oxygen and carbon dioxide is obtained by recycling part of the flue gas rich in carbon dioxide and mixing it with oxygen (typically at 95% purity) coming from a cryogenic air separation unit. The flue gas is then purified in order to remove components like water and oxygen and compressed to a pressure between 100 and 200 bar abs in order to be injected underground (see FIG. 1). It should be noted that the recycling of flue gases would not be necessary with high temperature materials for the boiler. However, they do not exist at the time of invention. The recycling of flue gases is not mandatory for the invention disclosed here in.

EP-A-0503910 describes a process for the recovery of carbon dioxide and other acid gases from flue gases coming from a power plant using the oxycombustion technique A more recent document on the same subject is "Oxy-Combustion Processes for $CO_2$ Capture from Power Plant" IEA Report No. 2005/9, September 2005, Process Flow Diagrams 6, p. 1, and 11, p. 1.

The purpose of this invention is to improve the solution proposed in this patent both in term of specific energy and/or carbon dioxide recovery and/or carbon dioxide product purity.

SUMMARY OF THE INVENTION

According to the present invention, there is provided a process for separating carbon dioxide from a fluid containing carbon dioxide, $NO_2$ and at least one of oxygen, argon, and nitrogen comprising the steps of:
  i) separating at least part of the fluid into a carbon dioxide enriched stream, a carbon dioxide depleted stream comprising $CO_2$ and at least one of oxygen, argon and nitrogen and a $NO_2$ enriched stream; and
  ii) recycling said $NO_2$ enriched stream upstream of the separation step.
  According to further optional features:
  the separation step of i) includes:
    a) separating at least part of the fluid into a carbon dioxide enriched stream, a carbon dioxide depleted stream comprising $CO_2$ and at least one of oxygen, argon and nitrogen; and
    b) separating the carbon dioxide enriched stream to form a $NO_2$ enriched stream and the recycling step ii) consists of recycling the $NO_2$ enriched stream upstream of separation phase a);
  the separation phase b) consists of producing the $NO_2$ enriched stream by distillation;
  the separation phase b) consists of producing the $NO_2$ enriched stream by phase separation;
  the separation phase b) consists of producing the $NO_2$ enriched stream by adsorption;
  the separation step i) includes a) separating the fluid to produce the $NO_2$ enriched stream and an $NO_2$ depleted stream and b) separating the $NO_2$ depleted stream to produce a carbon dioxide enriched stream and a carbon dioxide depleted stream;
  the $NO_2$ enriched stream is removed by sending the fluid to an adsorption unit, removing the $NO_2$ depleted gas to the adsorption unit, sending a regeneration gas to the adsorption unit and removing the regeneration gas from the adsorption unit as the $NO_2$ enriched stream;

the $NO_2$ enriched stream is recycled to a unit producing the fluid;

the unit producing the fluid is a combustion zone of a boiler;

the fluid is compressed in a compressor upstream of separation step i) and the $NO_2$ enriched stream is recycled upstream of the compressor;

the $NO_2$ enriched stream is recycled to a unit for treating the fluid;

the $NO_2$ enriched stream reacts with SO2 in the unit for treating the fluid to form $SO_3$ and NO;

the $SO_3$ subsequently reacts with water to form sulfuric acid;

the unit for treating the fluid is a wash column;

a unit for producing the fluid is a boiler with burners generating more than 500 ppm $NO_x$;

a unit producing the fluid generates enough $NO_x$ to convert most of the $SO_2$ contained in the flue gas to sulfuric acid; and $NO_x$ produced by an external source, possibly another plant of the same or another kind, is added to the unit producing the fluid and used to oxidize at least part of the $SO_2$ contained in the flue gas.

According to a further aspect of the invention, there is provided an apparatus for separating carbon dioxide from a fluid containing carbon dioxide, NO2 and at least one of oxygen, argon, and nitrogen comprising:

i) a separation unit for separating at least part of the fluid into a carbon dioxide enriched stream, a carbon dioxide depleted stream comprising $CO_2$ and at least one of oxygen, argon and nitrogen and a $NO_2$ enriched stream ii) a conduit for recycling said $NO_2$ enriched stream upstream of the separation unit According to further optional features:

the separation unit includes:
  a) a carbon dioxide separation unit for separating at least part of the fluid into a carbon dioxide enriched stream, a carbon dioxide depleted stream comprising $CO_2$ and at least one of oxygen, argon, and nitrogen; and
  b) an $NO_2$ separation unit for separating the carbon dioxide enriched stream to form a $NO_2$ enriched stream and wherein the conduit connects the $NO_2$ separation unit with a point upstream of the carbon dioxide separation unit to permit the $NO_2$ enriched stream to be sent to that point;

the $NO_2$ separation unit comprises at least one distillation column;

the $NO_2$ separation unit comprises at least one phase separator;

the $NO_2$ separation unit comprises at least one distillation column and at least one phase separator;

the $NO_2$ separation unit comprises at least one adsorption unit;

the separation unit includes a) an $NO_2$ separation unit for separating the fluid to produce the $NO_2$ enriched stream and an $NO_2$ depleted stream and b) a carbon dioxide separation unit for separating the $NO_2$ depleted stream to produce a carbon dioxide enriched stream and a carbon dioxide depleted stream and the conduit connects the $NO_2$ separation unit with a point upstream of the carbon dioxide separation unit to permit the $NO_2$ enriched stream to be sent to that point;

the apparatus comprises an adsorption unit, a conduit for sending the fluid to the adsorption unit, a conduit for removing the $NO_2$ depleted gas from the adsorption unit, a conduit for sending a regeneration gas to the adsorption unit and a conduit for removing the regeneration gas from the adsorption unit as the $NO_2$ enriched stream;

the apparatus comprises a unit producing the fluid and wherein the conduit for recycling the $NO_2$ enriched stream is connected to the unit producing the fluid;

the unit producing the fluid is a combustion zone of a boiler;

the $NO_2$ enriched stream is recycled to a unit for treating the fluid;

the unit for treating the fluid is a compressor upstream of separation unit and comprising a conduit for sending the fluid to the compressor and wherein the conduit for recycling the $NO_2$ enriched stream is connected upstream of the compressor; and the unit for treating the fluid is a wash column.

DETAILED DESCRIPTION OF THE INVENTION

Figure 1:
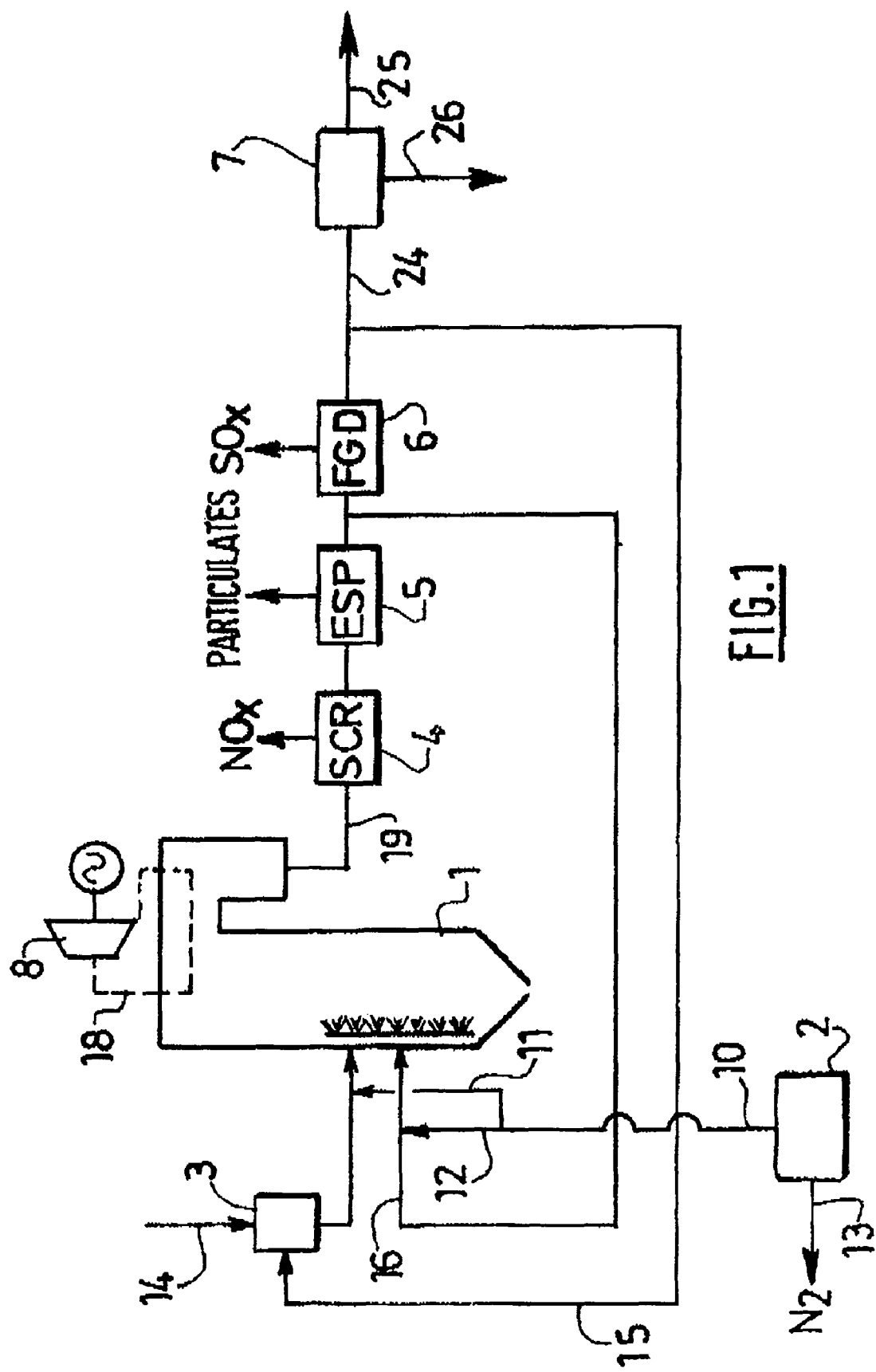
FIG. 1 illustrates a schematic view of an oxycombustion plant, in accordance with one embodiment of the present invention.
Figure 3:
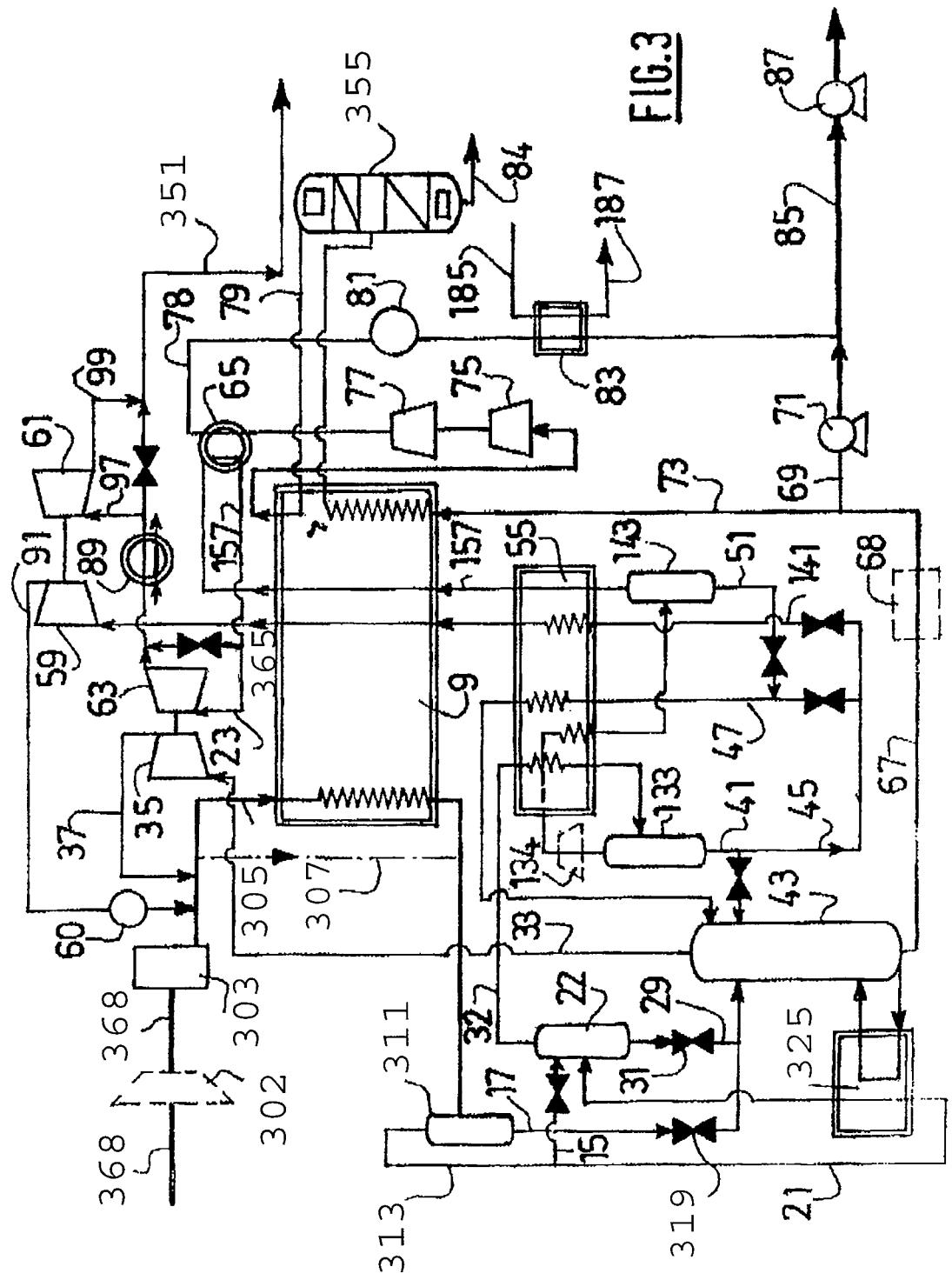
FIG. 3 illustrates a low temperature purification unit that could be used as unit 102 in FIG. 2.
Figure 4:
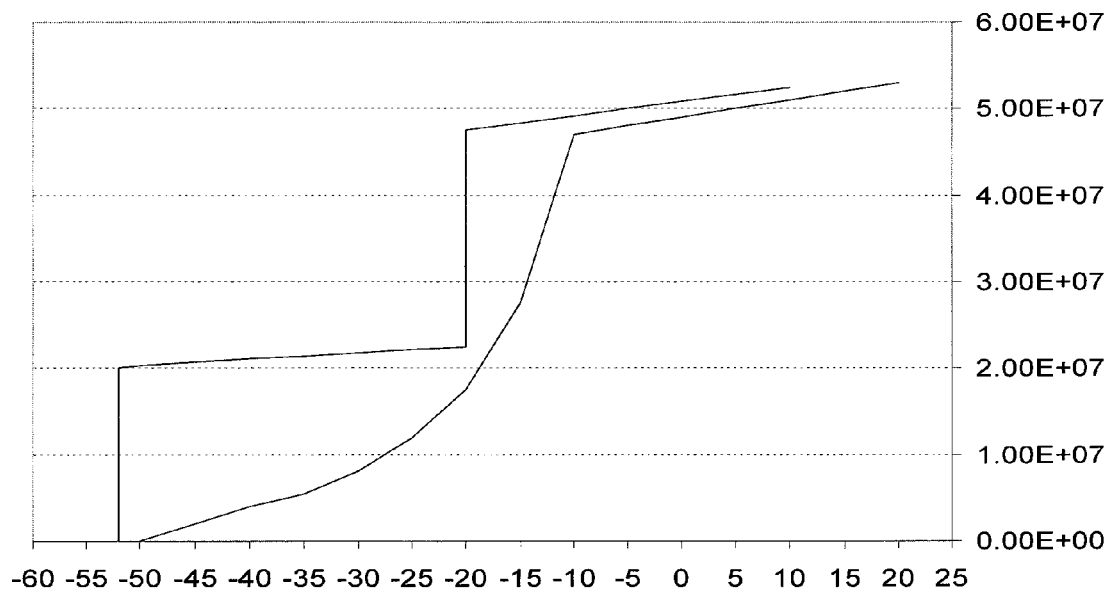
FIG. 4 illustrates a heat exchange diagram for heat exchange between a vaporizing high purity carbon dioxide stream and a cooling and condensing feed stream as known in the prior art.
Figure 5:
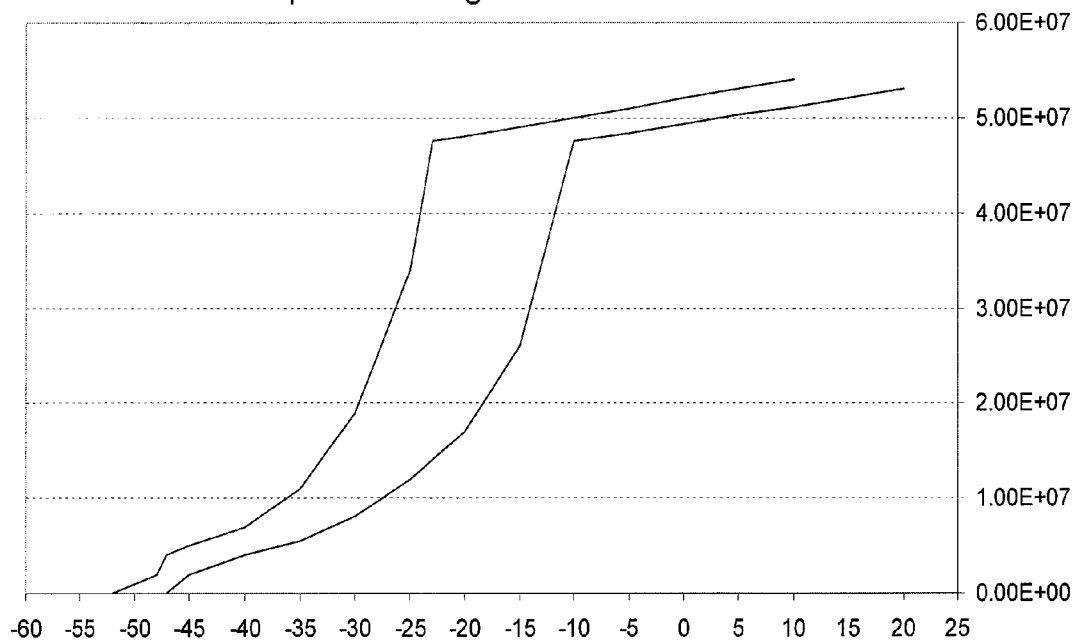
FIG. 5 illustrates a heat exchange diagram for heat exchange between an intermediate purity carbon dioxide stream and a cooling and condensing feed stream as observed in exchanger 55 of FIG. 3.

The invention will now be described in further detail with reference to the figures of which FIGS. 1 and 3 show apparatuses according the invention, in varying degrees of detail, going from FIG. 1 which is the least detailed to FIG. 3 which is the most detailed. FIGS. 4 and 5 show heat exchange diagrams for the prior art and one of the exchangers of FIG. 3 respectively.

FIG. 1 is a schematic view of an oxycombustion plant. Air separation unit 2 produces an oxygen stream 10 at a typical purity of 95-98 mol. % and a waste nitrogen stream 13. Oxygen stream 10 is split into two sub streams 11 and 12. The primary flue gas recycle stream 15 passes through coal mills 3 where coal 14 is pulverized. Substream 11 is mixed with the recycle stream downstream of the coal mills 3 and the mixture is introduced in the burners of the boiler 1. Sub stream 12 is mixed with secondary flue gas recycle stream 16 which provides the additional ballast to the burners to maintain temperatures within the furnace at acceptable levels. Water stream(s) is introduced in the boiler 1 in order to produce steam stream(s) 18 which is expanded in steam turbine 8. Flue gas stream 19 rich in $CO_2$, typically containing more than 70 mol. % on a dry basis, goes through several treatments to remove some impurities. Unit 4 is NOx removing system like selective catalyst reduction. Unit 5 is a dust removal system such as electrostatic precipitator and/or baghouse filters. Unit 6 is a desulfurization system to remove $SO_2$ and/or $SO_3$. Units 4 and 6 may not be necessary depending on the $CO_2$ product specification. Flue gas stream 24 is then introduced in a compression and purification unit 7 in order to produce a high $CO_2$ purity stream 25 which will be sequestrable and a waste stream 26.

Figure 2:
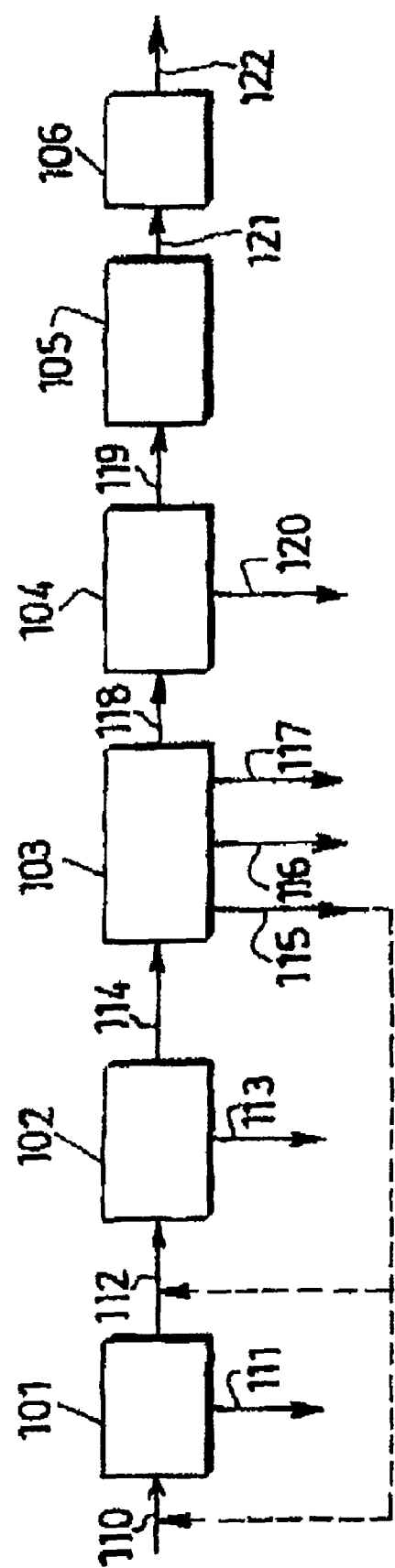
FIG. 2 illustrates a schematic view of a compression and purification unit which could be used as unit 7 in FIG. 1.

FIG. 2 is a schematic view of a compression and purification unit which could be used as unit 7 in FIG. 1. Flue gas stream 110 (corresponding to stream 24 of FIG. 1) enters a low pressure pretreatment unit 101 where it is prepared for compression unit 102. This unit could include, for example, among other steps:

- a dust removal step in a wet scrubber and/or a dry process either dynamic, such as pulse-jet cartridges or static, such as pockets and cartridges;
- a (further) desulfurization step in a wet scrubber with water and/or soda ash or caustic soda injection; and
- a cooling step in order to minimize the flow through water condensation and the power of compression unit both due to flow and temperature reduction.

Waste stream(s) 111 could consist of condensed water, dust and dissolved species like $H_2SO_4$, $HNO_3$, $Na_2SO_4$, $CaSO_4$, $Na_2CO_3$, $CaCO$ . . . .

Compression unit 102 compresses stream 112 from a pressure close to atmospheric pressure to a high pressure typically between 15 and 60 bar abs, preferably around 30 bar abs. This compression could be done in several stages with intermediate cooling. In this case, some condensate(s) 113 could be produced. Heat of compression could also be recovered in these intermediate cooling step, for example to preheat boiler feed water. Hot stream 114 leaves the compression unit 102 and enters a high pressure pretreatment unit 103. This unit at least includes:

- one or several cooling step(s) in order to decrease the temperature and decrease the water content; and
- a drying step to remove most of the water, for example by adsorption.

and could include (non-exhaustive list):

- a high pressure washing column for cooling and/or purification; and
- a mercury removal step.

Effluents from this unit are gaseous stream 115 (regeneration stream of the drying step) and could be liquid stream(s) 116/117 (from the cooling step and/or the high pressure washing column).

The stream 114 may contain $NO_2$. In this case, it is sometimes preferable to remove the $NO_2$ by adsorption upstream of the unit 104. In this case, the stream 114 may be treated by adsorption and the regeneration gas used to regenerate the adsorbent is removed having a content enriched in $NO_2$ with respect to that of stream 114. The gaseous stream 115 may be recycled at least in part upstream of the compression unit 102, upstream of the pretreatment unit 101 or to the boiler 1 of the combustion unit.

Below 158° C., $NO_2$ is in equilibrium with its polymer/dimer $N_2O_4$. The lower the temperature, the higher the concentration of $N_2O_4$ compared to $NO_2$. In this document, the word $NO_2$ is used to mean not only $NO_2$ but also its polymer/dimer $N_2O_4$ in equilibrium.

Unit 104 is a low temperature purification unit. In this case, low temperature means a minimum temperature in the process cycle for the purification of the flue gas below 0° C. and preferably below −20° C. as close as possible to the triple point temperature of pure $CO_2$ at −56.6° C. In this unit, stream 118 is cooled down and partially condensed in one (or several steps). One (or several) liquid phase stream(s) enriched in $CO_2$ is (are) recovered, expanded and vaporized in order to have a product enriched in $CO_2$ 119. One (or several) non-condensible high pressure stream(s) 120 is (are) recovered and could be expanded in an expander.

$CO_2$ enriched product 119 is further compressed in compression unit 105. In unit 106 compressed stream 121 is condensed and could be further compressed by a pump in order to be delivered at high pressure (typically 100 to 200 bar abs) as stream 122 to a pipeline to be transported to the sequestration site.

FIG. 3 shows a low temperature purification unit that could be used as unit 104 in FIG. 2. At least one process according to the invention operates within such a unit.

Stream 368 comprising flue gas at around 30 bar and at a temperature of between 15° C. and 43° C. is filtered in 303 to form stream 305. Stream 368 contains mainly carbon dioxide as well as $NO_2$, oxygen, argon and nitrogen. It may be produced by unit 103 directly at the high pressure or may be brought up to the high pressure using optional compressor 302 shown in dashed lines. Stream 305 cools in heat exchange line 9 and is partially condensed. Part 7 of stream 305 may not be cooled in the heat exchange but is mixed with the rest of stream 305 downstream of the heat exchange line to vary its temperature. The partially condensed stream is sent to first phase separator 311 and separated into gaseous phase 313 and liquid phase 17. The gaseous phase 313 is divided in two to form stream 15 and stream 21. Stream 21 is used to reboil column 43 in exchanger 325 and is then sent to a second phase separator 22. Stream 15 by-passes the reboilers in order to control the reboiling duty.

Liquid stream 17 from the first phase separator 311 is expanded in valve 319 and liquid stream 29 is expanded in valve 31, both streams being then sent to the top of column 43. Column 43 serves principally to remove the incondensable components (oxygen, nitrogen, and argon) from the feed stream.

A carbon dioxide depleted stream 33 is removed from the top of column 43 and sent to compressor 35. The compressed stream 37 is then recycled to stream 305.

A carbon dioxide enriched or rich stream 67 is removed from the bottom of column 43 and divided in two. One part 69 is pumped by pump 71 to form stream 85, further pumped in pump 87 and then removed from the system. Stream 85 corresponds to stream 25 of FIG. 1. The rest 73 provides the frigorific balance.

It is desirable to provide means for removing $NO_2$ from the fluid 368 to be separated. In general this involves separating at least part of the fluid 368 into a carbon dioxide enriched stream, a carbon dioxide depleted stream comprising $CO_2$ and at least one of oxygen, argon, and nitrogen and a $NO_2$ enriched stream, and recycling the $NO_2$ enriched stream upstream of the separation step.

The incondensable removal step (removing mainly $O_2$ and/or $N_2$ and/or Ar) may take place before or after the $NO_2$ removal step.

Several types of $NO_2$ removal step may be envisaged, involving distillation and/or phase separation and/or adsorption. The adsorption step may be carried out on a product of the $CO_2$ separation step or the fluid itself before separation.

In FIG. 3, after stream 69 is removed, the rest of the carbon dioxide enriched stream 73 is vaporized in heat exchange line 9 and sent to $NO_2$ removal column 355.

This column may have a top condenser and a bottom reboiler, as shown, the feed being sent to an intermediate point. Alternatively, there need be no bottom reboiler, in which case the feed is sent to the bottom of the column. An $NO_2$ depleted stream 79 is removed from the column and sent back to the heat exchange line. This stream is further warmed, compressed in compressors 75, 77, sent to heat exchanger 65, removed therefrom as stream 78, cooled in exchangers 81, 83 and mixed with stream 69 to form stream 85. Exchanger 81 may be used to preheat boiler feed water. Exchanger 83 is cooled using a refrigerant stream 185 which may be R134a, ammonia, water, water mixed with glycol or any other suitable fluid. The warmed fluid is designated as 187. An $NO_2$ enriched stream 84 is removed from the bottom of the column 355. This stream 84 is then recycled to a point upstream of filter 303.

Alternatively or additionally the separation phase may consist of producing the $NO_2$ enriched stream by adsorption of the $NO_2$ contained in stream 67 in adsorption unit 68.

In either case, at least part of the $NO_2$ enriched stream may be recycled to a unit producing the fluid, such as the combustion zone of a boiler 1, as seen previously for stream 365. It should be noted that recycling $NO_x$ in the combustion zone does not increase the $NO_x$ content in the flue gas. In other words, recycling $NO_x$ to the combustion zone eliminates NOx.

Additionally or alternatively at least part of the $NO_2$ enriched stream may be recycled to a unit for treating the fluid.

For example the $NO_2$ enriched stream may be recycled upstream of the compressor 302 (if present) or one of units 351, 102.

In addition, low-NOx burners (with NOx content in the flue gas in the range of 150-500 ppm volume) may not be required anymore. To convert $SO_2$ to sulfuric acid, it is desirable to have an excess of $NO_2$. As $SO_2$ content in the flue gas is in general higher than 500 ppm (typically several thousands ppm), it is now better to have burners which generate high amounts of NOx (typically also several thousands ppm). Those burners will be more compact (no need for stage combustion) and more heat efficient (higher heat input for a given volume). Therefore, the furnace could be more compact and thus less costly.

$NO_2$ is recycled because in the low pressure flue gas coming from the boiler, the NOx are essentially under the NO form which does not react with $SO_2$. It is only by compressing the flue gas and cooling it, that the oxidation of NO to form $NO_2$ ($2NO+O_2 <\!> NO_2$) occurs. This reaction has very low In a wash column where $SO_2$ is present in the flue gas, the recycled $NO_2$ enriched stream will react with $SO_2$ to form NO and $SO_3$ that will immediately turn to $H_2SO_4$ with water and be removed in the water drain. Therefore, if enough $NO_2$ is present in the recycled stream, it is a means to remove $SO_x$ from the flue gas and to avoid the injection of reactants like soda ash or caustic soda or even a classical flue gas desulphurization.

Top gas 32 from the second phase separator 22 is cooled in heat exchanger 55 and sent to third phase separator 133. Part of the liquid from the phase separator 133 is sent to the column 43 and the rest as the intermediate purity stream 45 is divided in two streams 47, 141. Stream 47 is vaporized in heat exchanger 55 and sent to the top of column 43 or mixed with stream 33.

Stream 141 is expanded in a valve, warmed in heat exchangers 55, 9, compressed in compressor 59, cooled as stream 91 in heat exchanger 60, and mixed with compressed stream 305. The valve used to expand stream 141 could be replaced by a liquid expander.

The top gas from the third phase separator 133 is cooled in heat exchanger 55, optionally after compression by compressor 134 and sent to a fourth phase separator 143. The carbon dioxide lean top gas 157 from fourth phase separator 143 is warmed in heat exchanger 55, then in heat exchanger 9 as stream 157, warmed in exchanger 65 and expanded as stream 23 in expander 63, coupled to compressor 35. The carbon dioxide lean top gas 157 contains between 30 and 45% carbon dioxide and between 30 and 45% nitrogen. It also contains substantial amounts of oxygen and argon. The bottom liquid 51 from phase separator 143 is sent to the column with stream 47.

The stream expanded in expander 63 is mixed with stream 365 which does not pass through the expander and then warmed in 89. Part 97 of the warmed stream is expanded in expander 61 and sent as stream 99, 351 to the atmosphere.

The optional compressor 302 may be powered by one of expanders 61, 63.

Expander 61 is coupled to compressor 59 in the figure.

TABLE 1

| | Molar fractions in % (example) for $O_2$, $N_2$, Ar, $CO_2$ | | | | | | |
|---|---|---|---|---|---|---|---|
| FLUIDS/Components | 118 | 33 | 67 | 84 | 157 | 141 | 78 |
| $O_2$ | 2.5 | 4.8 | 0 | 0 | 13.3 | 2.3 | 0 |
| $N_2$ | 7.8 | 11 | 0 | 0 | 43.8 | 0.1 | 0 |
| Ar | 1.9 | 4.9 | 0 | 0 | 9.5 | 2.6 | 0 |
| $CO_2$ | 87.8 | 79.3 | 99.95 | 99 | 33.4 | 95 | 100 |
| NOx | 250 ppm | 50 ppm | 500 ppm | 1 | 5 ppm | 500 ppm | 0 | kinetics at atmospheric pressure. The kinetics are tremendously improved by high pressure and to a lower extent by low temperature.

If there is not enough NOx from the boiler to oxidize the SOx from the same flue gas, it is an option to introduce NOx, being mostly $NO_2$, into the flue gas at low pressure from an external source, upstream of the low pressure scrubbing column. Part of the NOx will be recirculated in the process via the separation in the low temperature section. Part of the NOx must be reintroduced continuously or from time to time because of NOx losses in condensate purges.

It may be advantageous to recycle at least part of the $NO_2$ enriched stream to a wash column, such as that of pretreatment unit 103. In this case, the $NO_2$ may be converted to nitric acid in the wash column and subsequently removed from the system.

FIG. 4 shows a heat exchange diagram for heat exchange between a vaporizing high purity carbon dioxide stream and a cooling and condensing feed stream as known from the prior art.

FIG. 5 shows a heat exchange diagram for heat exchange between an intermediate purity carbon dioxide stream and a cooling and condensing feed stream as observed in exchanger 55 of FIG. 3.

What is claimed is:
1. An apparatus for separating carbon dioxide from a fluid containing carbon dioxide, $NO_2$ and at least one of oxygen, argon, and nitrogen comprising:
  i) a separation unit for separating at least part of the fluid into a carbon dioxide enriched stream, a carbon dioxide depleted stream comprising $CO_2$ and at least one of oxygen, argon and nitrogen and a $NO_2$ enriched stream;

ii) a conduit for recycling said $NO_2$ enriched stream upstream of the separation unit, and;

iii) a unit for producing the fluid, wherein the conduit for recycling the $NO_2$ enriched stream is connected to the unit producing the fluid.

2. The apparatus of claim 1, wherein the unit producing the fluid is a combustion zone of a boiler.

3. An apparatus for separating carbon dioxide from a fluid Containing carbon dioxide, $NO_2$ and at least one of oxygen, argon, and nitrogen comprising:

i) a separation unit for separating at least part of the fluid into a carbon dioxide enriched stream, a carbon dioxide depleted stream comprising $CO_2$ and at least one of oxygen, argon and nitrogen and a $NO_2$ enriched stream; and ii) a conduit for recycling said $NO_2$ enriched stream upstream of the separation unit, wherein the $NO_2$ enriched stream is recycled to a unit for treating the fluid, wherein the unit for treating the fluid is a compressor upstream of the separation unit and comprising a conduit for sending the fluid to the compressor and wherein the conduit for recycling the $NO_2$ enriched stream is connected upstream of the compressor.

4. An apparatus for separating carbon dioxide from a fluid containing carbon dioxide, $NO_2$ and at least one of oxygen, argon, and nitrogen comprising:

i) a separation unit for separating at least part of the fluid into a carbon dioxide enriched stream, a carbon dioxide depleted stream comprising $CO_2$ and at least one of oxygen, argon and nitrogen and a $NO_2$ enriched stream; and ii) a conduit for recycling said $NO_2$ enriched stream upstream of the separation unit, wherein the $NO_2$ enriched stream is recycled to a unit for treating the fluid, wherein the unit for treating the fluid is a wash column.

* * * * *